M. McDONALD.
FASTENING DEVICE.
APPLICATION FILED JUNE 8, 1916. RENEWED JAN. 22, 1917.
1,236,458.
Patented Aug. 14, 1917.
2 SHEETS—SHEET 1.
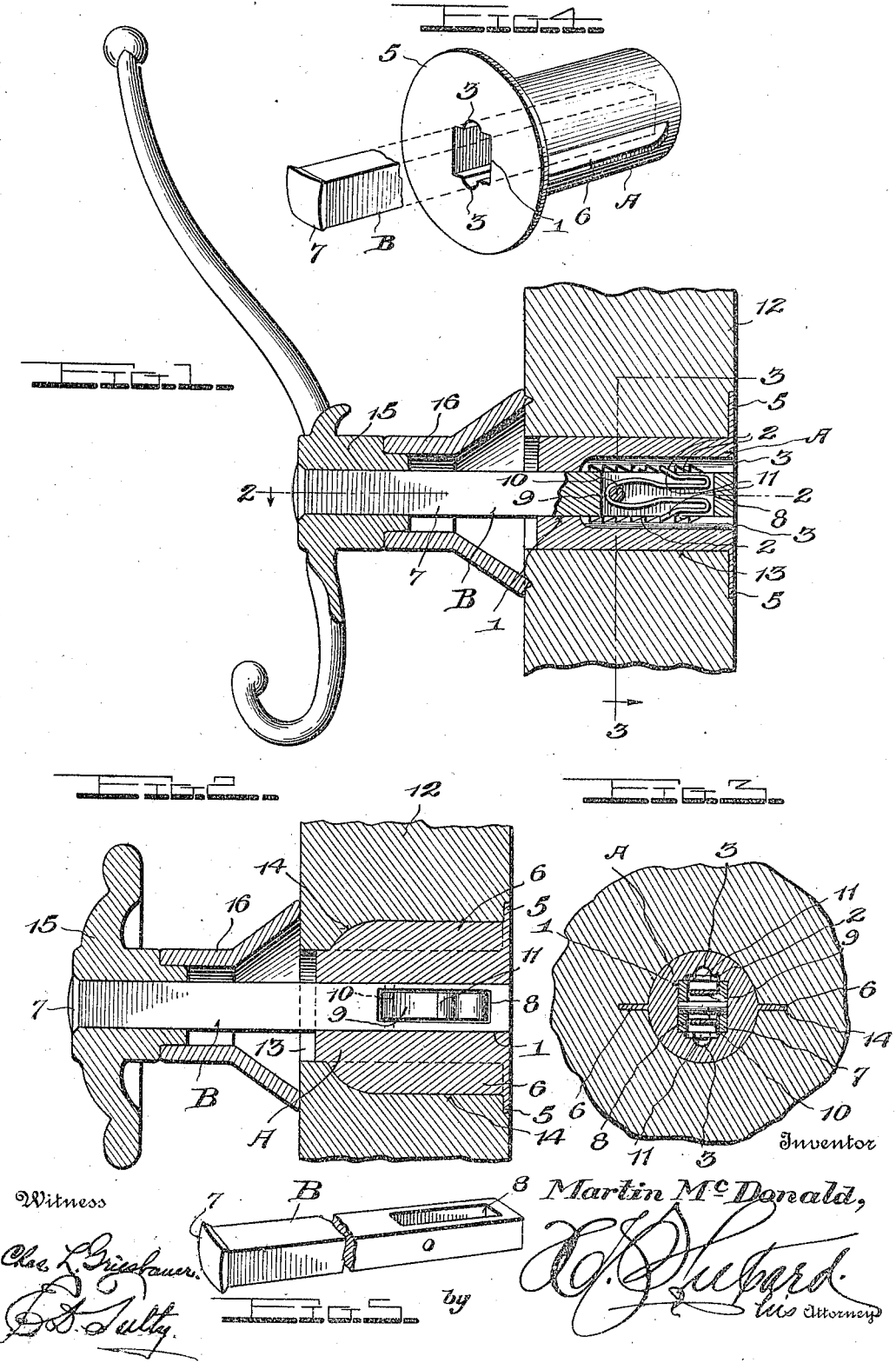
Witness
Martin McDonald, Inventor

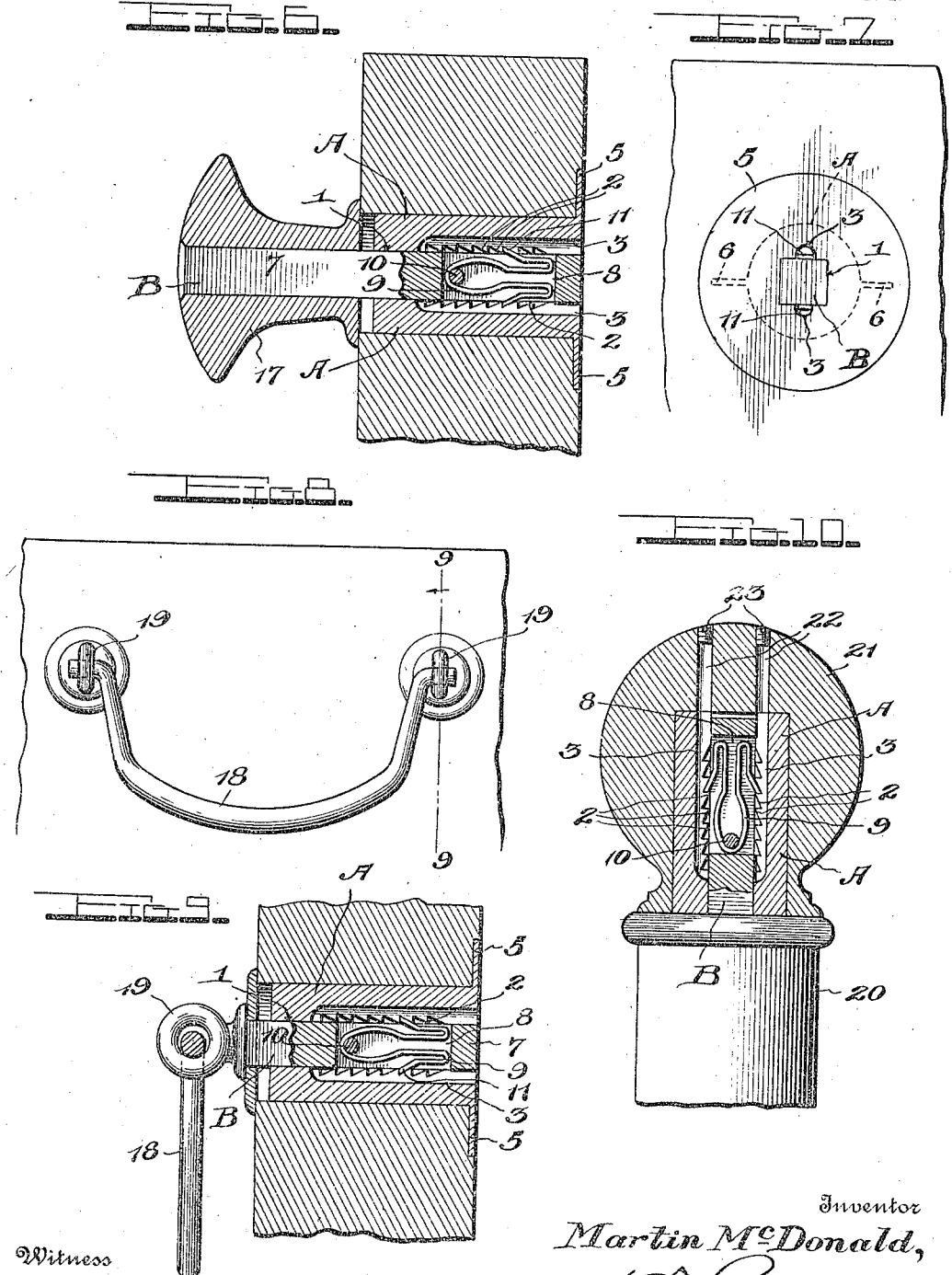

UNITED STATES PATENT OFFICE.

MARTIN McDONALD, OF WASHINGTON, DISTRICT OF COLUMBIA.

FASTENING DEVICE.

1,236,458.  Specification of Letters Patent.  Patented Aug. 14, 1917.

Application filed June 8, 1916, Serial No. 102,469. Renewed January 22, 1917. Serial No. 143,854.

*To all whom it may concern:*

Be it known that I, MARTIN McDONALD, a citizen of the United States, residing at Washington, District of Columbia, have invented new and useful Improvements in Fastening Devices, of which the following is a specification.

This invention is a fastening device and includes a socket member adapted to be embedded in one of the parts to be connected, and a shank member to carry the other part and adapted to be conveniently assembled with the socket member and held rigidly therein against endwise and rotative movements.

Important objects of the present invention are to facilitate the assemblage of the socket and shank members; to effectually prevent looseness of the shank member in the socket member; to provide for tightening the device; and to provide for the convenient disengagement and separation of the parts whenever necessary.

A further object of the invention is to have the interconnecting portions of the shank and socket entirely housed within the latter in such a manner as to prevent the same from working loose under the use of the device.

With these and other objects in view, the present invention consists in the combination and arrangement of parts, as will be hereinafter more fully described, shown in the accompanying drawings, and particularly pointed out in the appended claims, it being understood that changes in the form, proportion, size and minor details may be made, within the scope of the claims, without departing from the spirit or sacrificing any of the advantages of the invention.

In the accompanying drawings,

Figure 1 is a longitudinal sectional view of the present invention used in connection with a hat and coat hook.

Fig. 2 is a sectional view on the line 2—2 of Fig. 1.

Fig. 3 is a cross-sectional view on the line 3—3 of Fig. 1.

Fig. 4 is a detail perspective view of the fastening device, a portion of the shank being broken away.

Fig. 5 is a detail perspective view of the shank member.

Fig. 6 is a longitudinal sectional view showing the device used in connection with a drawer knob.

Fig. 7 is an inner end view of the same.

Fig. 8 is a front view of a swinging drawer pull held in place by a pair of devices of the present invention.

Fig. 9 is an enlarged sectional view on the line 9—9 of Fig. 8.

Fig. 10 is a vertical sectional view showing the present device used for securing an ornamental knob to a bedstead post.

Like characters of reference indicate corresponding parts in each of the figures of the drawings.

Referring at first more particularly to Figs. 1 to 5, inclusive, it will be seen that the present invention includes a socket member A and a shank member B. The socket member A may be of any desired configuration and is shown in the accompanying drawings as cylindrical in shape and provided with a non-circular bore 1 extending throughout the length of the socket member and open at opposite ends. As shown in the accompanying drawings, this bore is rectangular in shape, and opposite walls of the bore are provided with ratchet teeth 2. Each set of ratchet teeth is intersected by a groove or channel 3 extending longitudinally of the socket and opening through one end thereof, for a purpose as will be hereinafter described. One end of the socket member is provided with a head or flange 5, and extending longitudinally of the exterior of the socket are ribs or wings 6 intended to prevent rotation of the socket, as will be hereinafter described.

The shank B is of a suitable length and is of a size and shape to fit within the bore 1 of the socket. One end of the shank is provided with a head 7, and in the other end portion of the shank there is a longitudinal slot 8, extending entirely through the shank, and in this shank there is a dog or pawl 9. This dog or pawl is formed of a single piece of metal bent into U shape and straddles a pin 10 extending through the slotted portion of the shank. Each end 11 of the dog is bent back to form a spring finger which extends outwardly through the slot 8 into coöperative engagement with the adjacent set of ratchet teeth on the interior of the socket.

In the application of the device, as shown in Figs. 1, 2 and 3, it will be seen that the part 12, say for instance the body portion of a hat and coat rack, is provided with an opening 13, in which the socket member A is fitted, the wings or ribs 6 being received in suitable notches or kerfs 14 formed in the member 12, thereby to prevent rotation of the socket member. The head or flange 5 fits snugly against the back of the member 12 or is received in a recess therein so as to hold the socket against endwise movement in one direction. The slotted end of the shank B is then passed through the hub or eye 15 of a hat and coat hook and also through a spacing sleeve 16, and then the slotted end of the shank is pushed into the socket A until the spacing sleeve 16 has been drawn up snugly against the part 12, where it will be effectually held by reason of the fingers 11 of the dog holding against certain of the ratchet teeth 2. It will, of course, be understood that the parts 15 and 16 form no part of the present invention, and have been shown in the accompanying drawings merely to illustrate one application of this invention. With the parts in the position shown in Figs. 1 and 2, it is quite apparent that the hat and coat hook may be very conveniently secured to the part 12, and after being so secured will remain rigidly in place, for the reason that the dog holds the shank against endwise looseness, and by reason of the rectangular or non-circular shank B fitting within the similarly shaped bore of the non-rotatable socket, together with the fact that the opening through the hat and coat hook is also non-circular, the latter will be held against turning on the shank, thereby overcoming a very objectionable feature in hat and coat hooks as now generally secured to a hat and coat rack.

Should it become necessary or desirable to remove the hat and coat hook, say for instance in shipping the device, a nail or other device may be thrust into the respective openings 3 until the fingers 11 of the dog have been pushed inwardly and out of engagement with the ratchet teeth, when the shank B may be conveniently withdrawn and the hat and coat hook thereby detached.

In Figs. 6 and 7, the present invention has been shown for holding in place an ordinary drawer pull 17, and corresponds in all details to what has been shown in Figs. 1 to 6, inclusive.

In Fig. 8, there has been shown a swinging drawer pull 18 consisting of a bail or handle having its extremities sprung into eyes 19, each eye being carried by the outer end of the shank B, the remaining portions of the fastening being the same as hereinbefore described.

In Fig. 10 of the drawings, 20 designates a bedpost which is provided at its top with a shank or post B having the slot 8, dog 9 and pin 10, as hereinbefore described. A ball or other suitable ornament 21 contains a socket member A, as hereinbefore described, and this socket member is forced down upon the post and the ball or ornament held snugly in place in the manner hereinbefore described. If desired, the ball or ornament may be provided with a pair of openings 22 leading to the respective grooves 3 so as to receive nails or other devices for depressing the extremities of the dog to enable the convenient removal of the ball or ornament. The outer ends of the openings 22 may be provided with suitable removable closures 23, as desired.

Having thus described the invention, what I claim, is:—

1. A fastening device comprising a socket member and a shank member for removable engagement with the socket member, the socket member being provided with a longitudinal non-circular bore having ratchet teeth, and the shank member having a non-circular portion of a shape and size to enter the bore of the socket and have a contact fit therewith throughout all of the faces of the shank to prevent rotation thereof, said shank being provided with a dog for engagement with the ratchet teeth.

2. A fastening device comprising a socket member and a shank member for removable engagement with the socket member, the socket member having a non-circular bore provided at opposite sides with ratchet teeth, the shank having a non-circular portion of a shape and size to enter the bore of the socket and have a contact fit therewith throughout all of the faces of the shank to prevent rotation thereof, said portion of the shank being provided with a slot, and a double dog mounted in the slot with its extremities projecting at opposite sides of the shank and adapted to engage the respective ratchet teeth.

3. A fastening device comprising a socket member and a shank member for removable engagement with the socket member, the socket member having a non-circular bore provided with ratchet teeth, the shank having a non-circular portion of a shape and size to enter the bore of the socket and have a contact fit therewith throughout all of the faces of the shank to prevent rotation thereof, and said shank having a dog for engagement with the ratchet teeth, and the socket having an opening extending into the ratchet teeth to give access to the dog for forcing the same out of engagement with the teeth.

4. A fastening device comprising a socket member and a shank member for removable engagement with the socket member, said socket member being adapted to be embedded in a part to be connected and provided with means to prevent rotation thereof while embedded, the shank being adapted to carry a part at one end and its other end adapted to enter the bore of the socket, one of said members having a dog and the other having ratchet teeth for engagement by the dog.

5. A fastening device comprising a socket member having a non-circular bore and a shank member having a non-circular portion of a shape and size to enter the bore of the socket and have a contact fit therewith throughout all of the faces of the shank to prevent rotation thereof, the shank member being adapted to carry a part at one end and to enter the socket member at its other end, one of said members having a dog and the other having ratchet teeth for engagement by the dog when the non-circular portion of the shank is in the bore of the socket.

6. A fastening device comprising a socket member having a longitudinal non-circular bore and provided with ratchet teeth at opposite sides of the bore, and a shank of greater length than the socket, said shank being provided at one end with a head and at its opposite end with a non-circular portion provided with a longitudinal slot extending through the shank from side to side, and a double dog mounted in the slot and having its opposite ends extending outwardly through the open sides of the slot for engagement with the ratchet teeth of the socket, the non-circular portion of the shank being of a size and shape to enter the bore of the socket and have a contact fit therewith throughout all faces of the shank to prevent rotation thereof.

7. A fastening device comprising a socket member and a shank member for removable engagement with the socket member, the socket member having a non-circular bore, the shank member being adapted to carry a part at one end and having its other end portion non-circular and of a size and shape to enter and have a non-rotatable fit within the non-circular bore of the socket member, and means carried by one of the members and engaging the other member to prevent endwise play of the members upon one another.

MARTIN McDONALD.

Witnesses:
EDWARD D. TALTY,
HERBERT S. SHEPARD.

Copies of this patent may be obtained for five cents each, by addressing the "Commissioner of Patents, Washington, D. C."